(12) United States Patent
Robey et al.

(10) Patent No.: US 7,870,582 B2
(45) Date of Patent: Jan. 11, 2011

(54) METHOD FOR PROVIDING LONG TERM PROGRAM GUIDE DATA IN A VIDEO RECORDER SYSTEM WITH ACCESS TO ONLY SHORT TERM PROGRAM GUIDE DATA

(75) Inventors: Joshua Robey, Hollis, NH (US); Don H. Shulsinger, Waban, MA (US)

(73) Assignee: Broadcom Corporation, Irvine, CA (US)

( * ) Notice: Subject to any disclaimer, the term of this patent is extended or adjusted under 35 U.S.C. 154(b) by 1380 days.

(21) Appl. No.: 11/192,511

(22) Filed: Jul. 29, 2005

(65) Prior Publication Data

US 2007/0016927 A1 Jan. 18, 2007

Related U.S. Application Data

(60) Provisional application No. 60/698,793, filed on Jul. 13, 2005.

(51) Int. Cl.
*H04N 5/445* (2006.01)
(52) U.S. Cl. .......................................... 725/39; 725/50
(58) Field of Classification Search ............... 725/39–56
See application file for complete search history.

(56) References Cited

U.S. PATENT DOCUMENTS 5,353,121 A * 10/1994 Young et al. ................. 725/52

| | | | | |
|---|---|---|---|---|
| 6,337,719 B1 * | 1/2002 | Cuccia | ........................ | 348/731 |
| 6,591,421 B1 * | 7/2003 | Sullivan | ....................... | 725/50 |
| 7,051,352 B1 * | 5/2006 | Schaffer | ....................... | 725/39 |
| 7,299,483 B2 * | 11/2007 | Williams | ....................... | 725/22 |
| 7,370,343 B1 * | 5/2008 | Ellis | ............................ | 725/58 |
| 2005/0125357 A1 * | 6/2005 | Saadat et al. | ................... | 705/57 |

\* cited by examiner

*Primary Examiner*—Andrew Y Koenig
*Assistant Examiner*—Jasmine Stokely-Collins
(74) *Attorney, Agent, or Firm*—McAndrews, Held & Malloy, Ltd.

(57) ABSTRACT

Herein described are at least a method and a system for providing an extended forecast of scheduled video programming information provided by a multimedia provider. The extended forecast processes electronic program data (EPG) provided by the multimedia provider, such that a long term program guide (LTPG) may be developed. The LTPG provides a forecast of programs to be broadcasted that extends beyond what the EPG may provide. The method generates the LTPG by utilizing algorithms that compare newly received EPG data against historically processed EPG data. The system comprises a controller, a processor used for extracting EPG data from a signal, a memory that stores software, and a remote sensor capable of receiving signals transmitted by a remote control. When executed by the controller, the software implements the algorithms that generate the LTPG.

23 Claims, 4 Drawing Sheets

METHOD FOR PROVIDING LONG TERM PROGRAM GUIDE DATA IN A VIDEO RECORDER SYSTEM WITH ACCESS TO ONLY SHORT TERM PROGRAM GUIDE DATA

CROSS-REFERENCE TO RELATED APPLICATIONS/INCORPORATION BY REFERENCE

This application makes reference to and claims priority from U.S. Provisional Patent Application Ser. No. 60/698,793, entitled "METHOD FOR PROVIDING LONG TERM PROGRAM GUIDE DATA IN A VIDEO RECORDER SYSTEM WITH ACCESS TO ONLY SHORT TERM PROGRAM GUIDE DATA", filed on Jul. 13, 2005, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When a user wishes to record an upcoming program using a video recording device, he may make one or more assumptions based on short term information. The short term information may comprise electronic program data in the form of an electronic program guide (EPG). The EPG may comprise forecasted scheduling for a short term, such as seven days. Unfortunately, a user may wish to use a forecast beyond such a short term range. The user may wish to record one or more video programs over the course of several weeks time, while he is unable to access his video recording device. For example, the user may wish to record the programs while he is away on an extended business trip.

The limitations and disadvantages of conventional and traditional approaches will become apparent to one of skill in the art, through comparison of such systems with some aspects of the present invention as set forth in the remainder of the present application with reference to the associated drawings.

BRIEF SUMMARY OF THE INVENTION

Various aspects of the invention provide at least a system and a method that facilitates long term scheduling and recording of desired programs using a video recording device. The various aspects are substantially shown and described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Figure 1:
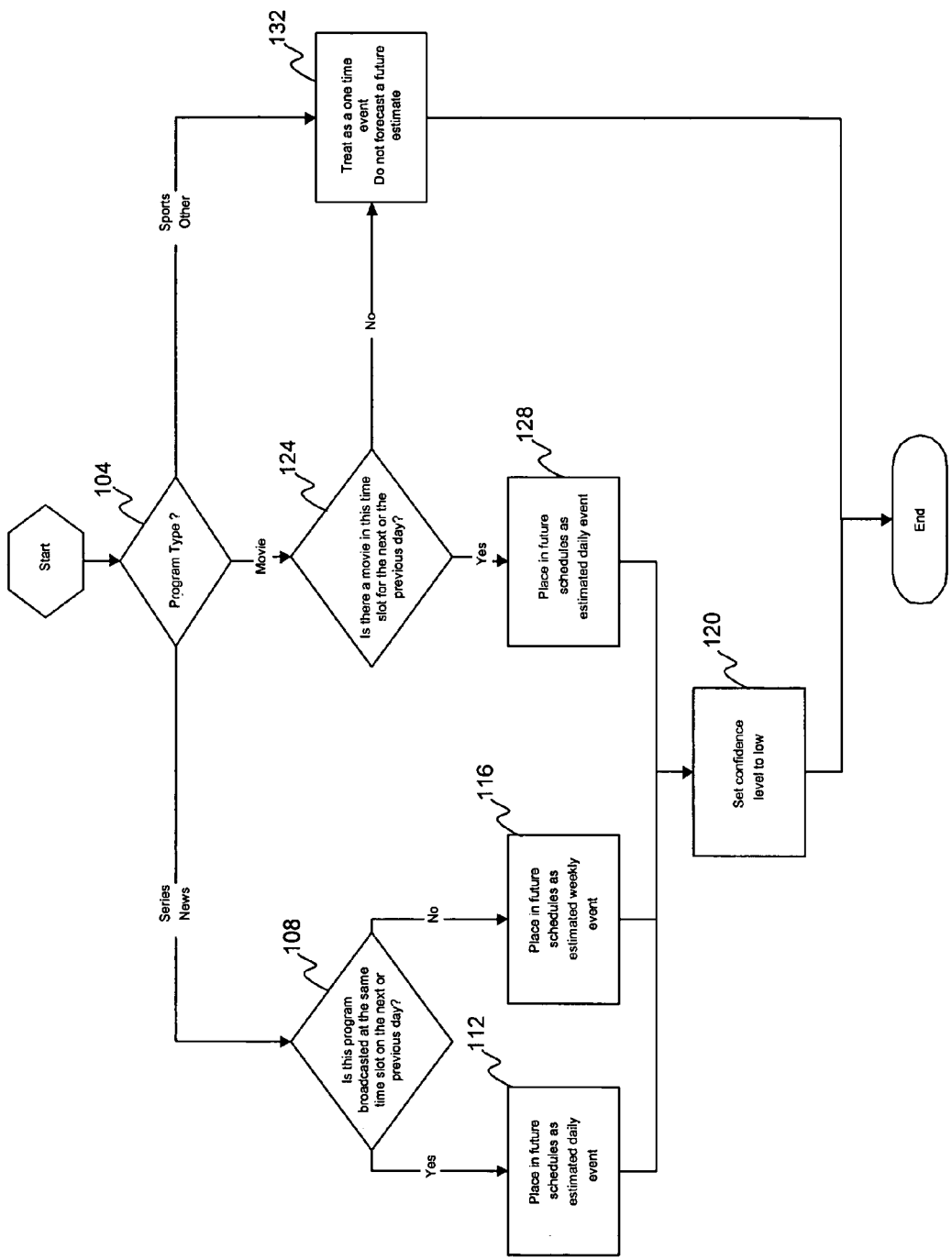
FIG. 1 is an operational flow diagram of a first algorithm used for developing a long term program guide (LTPG), in accordance with an embodiment of the invention.

Herein described are at least a method and a system for providing an extended forecast of scheduled video programming to be broadcasted by a telecommunications carrier. The extended forecast processes electronic program data (EPG) provided by the telecommunications carrier, such that a long term program guide (LTPG) may be developed. The LTPG provides a forecast of programs to be broadcasted that extends beyond what the EPG may provide. The method generates the LTPG by utilizing one or more algorithms that process the received EPG data. The one or more algorithms compare newly received EPG data against historically processed EPG data. The system comprises a controller, a processor for extracting EPG data from a signal, a memory that stores software, a remote sensor capable of receiving inputs provided by a user, and a remote control for transmitting the inputs to the remote sensor. The algorithms are implemented when the controller executes the software stored within the memory.

Various aspects of the invention provide at least a system and method of forecasting or extrapolating long term program guide (LTPG) data by using short term electronic program guide (EPG) data provided by an electronic program guide (EPG) provider. The short term EPG may be provided to a video recording device, such as a personal video recorder (PVR), digital video recorder (DVR), or DVD recorder, for example, such that the user may select one or more future programs to be recorded. The short term electronic program guide (EPG) may provide program or event data for up to 3 to 7 days in advance, for example. The long term program guide data may be used as a tool to forecast or extrapolate program or event data beyond the exemplary 3 to 7 days of program data provided by the short term EPG. The long term program guide (LTPG) comprises a listing or schedule of programs that are scheduled to be broadcast, which may be easily selected by the user of the PVR or DVD recorder. The long term program guide (LTPG) may be used as a forecasting tool to allow a user to record one or more desired future events. A user may select the desired future event by using a selecting device, such as a remote control, as previously mentioned. A telecommunications carrier or operator or any other like provider may provide the short term EPG data to the video recording device, for processing. The provider of the EPG data may comprise a cable operator or satellite operator capable of providing the EPG data by way of a telecommunications network, for example. The telecommunications network may comprise any terrestrial and/or wireless network. Of course, in addition to providing electronic program guides (EPGs), the telecommunications carrier or operator may provide various multimedia content (including the video programming to be recorded) to a user. The multimedia content may be multiplexed with the EPG before it is transmitted to the user's PVR or DVD recorder. The LTPG may be implemented using hardware and/or software within the video recording device. The LTPG provides long term forecasting that extends beyond the forecasting provided by an electronic program guide (EPG).

Various aspects of the invention utilize one or more algorithms for processing the EPG data received from the telecommunications carrier, such a long term program guide (LTPG) data may be provided to a user of a video recording device. A first algorithm may be used for initially generating the LTPG. The initialization procedure may be executed when a user first starts using the video recording device, or when the video recording device has been powered off such that its LTPG has lost its previously used or processed EPG data, for example. The first algorithm may be applied for a predetermined duration (e.g., one or two weeks) and its initial period of use may be configured by a manufacturer or user of the video recording device. The first algorithm provides an initial confidence level (i.e., a probability of occurrence) or likelihood that a particular program will be broadcasted at a future date. The first algorithm will be described in detail in reference to FIG. 1.

After the initialization period has elapsed, a second algorithm may be applied to the program schedules and associated confidence levels provided by the first algorithm. The second algorithm refines the program schedules and confidence levels provided by the first algorithm using a more sophisticated algorithm. The second algorithm will be described in detail in reference to FIG. 2.

Aspects of the invention implement one or more algorithms that utilize received EPG data. The EPG data may comprise one or more characteristics or factors that are used by the one or more algorithms. For example, the two algorithms may utilize characteristics such as genre of the desired event and its previously broadcasted date(s) and time slot(s). The genre descriptions describe the type of show, event, or program to be broadcast. For example, EPG data may categorize a program or event as either a sports, comedy, drama, special, or documentary program or show. Further, an event or program may be broadcast periodically. A program may comprise a weekly TV series, or a daily news program, for example. This type of genre and time pattern (or temporal) information is used by the one or more algorithms in the decision making process. For example, series or weekly shows may repeat at weekly intervals while the news usually repeats daily at a particular time slot. Specials and/or sports events typically do not exhibit such periodic behavior; these types of events usually preempt other regular scheduled programs. Movies rarely repeat; however, a movie show may be dedicated to a particular time slot in a particular day of the week.

FIG. 1 is an operational flow diagram of a first algorithm used for developing a long term program guide (LTPG), in accordance with an embodiment of the invention. The LTPG is developed over an initialization period in which the first algorithm is employed. The LTPG is available for normal use by a user after the initialization period. The first algorithm provides initial forecasts and corresponding confidence levels for each of the one or more scheduled programs. The initial forecasts and corresponding confidence levels are provided by one or more EPG data downloads occurring during this initialization period. The information gathered in this initialization period is subsequently used by a second algorithm in refining the LTPG. The EPG download is received by a video recording device, such as an exemplary PVR or DVD recorder. After a first EPG download is used to populate and/or generate an LTPG database, each of the one or more programs (or events) of a successive EPG download is compared with existing program information stored in the LTPG database. The first algorithm may be typically employed for a few weeks (e.g., two weeks), such that daily EPGs may be downloaded from the telecommunications carrier (or EPG provider) for each of the seven days in the two weeks. The information provided by the exemplary first two weeks facilitates formation of the LTPG. In a representative embodiment, the first algorithm may be employed for up to one month. The LTPG will be subsequently refined by a second, more sophisticated second algorithm. At step 104, the first algorithm determines the program type for each program provided by an EPG download. If the program type for a particular program comprises a series or a news event, the process continues at step 108. At step 108, the first algorithm determines if the program is a daily event. The first algorithm determines if the program is broadcast at the same time slot on the next or previous day. If so, the process proceeds with step 112. At step 112, the program is stored in the LTPG as a daily event. The LTPG may forecast the program for any number of days into the future. For example, a manufacturer or a user of the exemplary PVR or DVD recorder may preprogram or preconfigure the number of days in the future a particular type of program may be forecasted. If the algorithm determines that the program was not broadcast at the same time slot on the previous or next day, the process proceeds to step 116, at which the program is placed in the LTPG as a weekly event. The associated confidence level of any program may decrease as its forecast date is pushed further into the future. Thereafter, at step 120, the confidence level of the forecast is established. In a representative embodiment, the confidence level is set to a low value. The low value may comprise any low value of any range of values. If, at step 104 the program genre or type is determined to be a movie, the process continues at step 124. At step 124, the first algorithm determines whether a movie exists in the same time slot the previous or next day. If it is determined that a movie exists in the same time slot for the previous or next day, the process proceeds with step 128. The movie is stored in the LTPG as a daily event. Next, at step 120, the movie is given a low confidence rating and the confidence rating is stored into the LTPG database. If, at step 124, the movie is not found in the previous day's or following day's time slot, then the process continues at step 132, at which the movie is treated as a one time event. In a representative embodiment, any movie information (i.e., movie name, scheduled broadcast date/time, etc.) is not stored into the LTPG database and as a result, no forecast is made.

Figure 2:
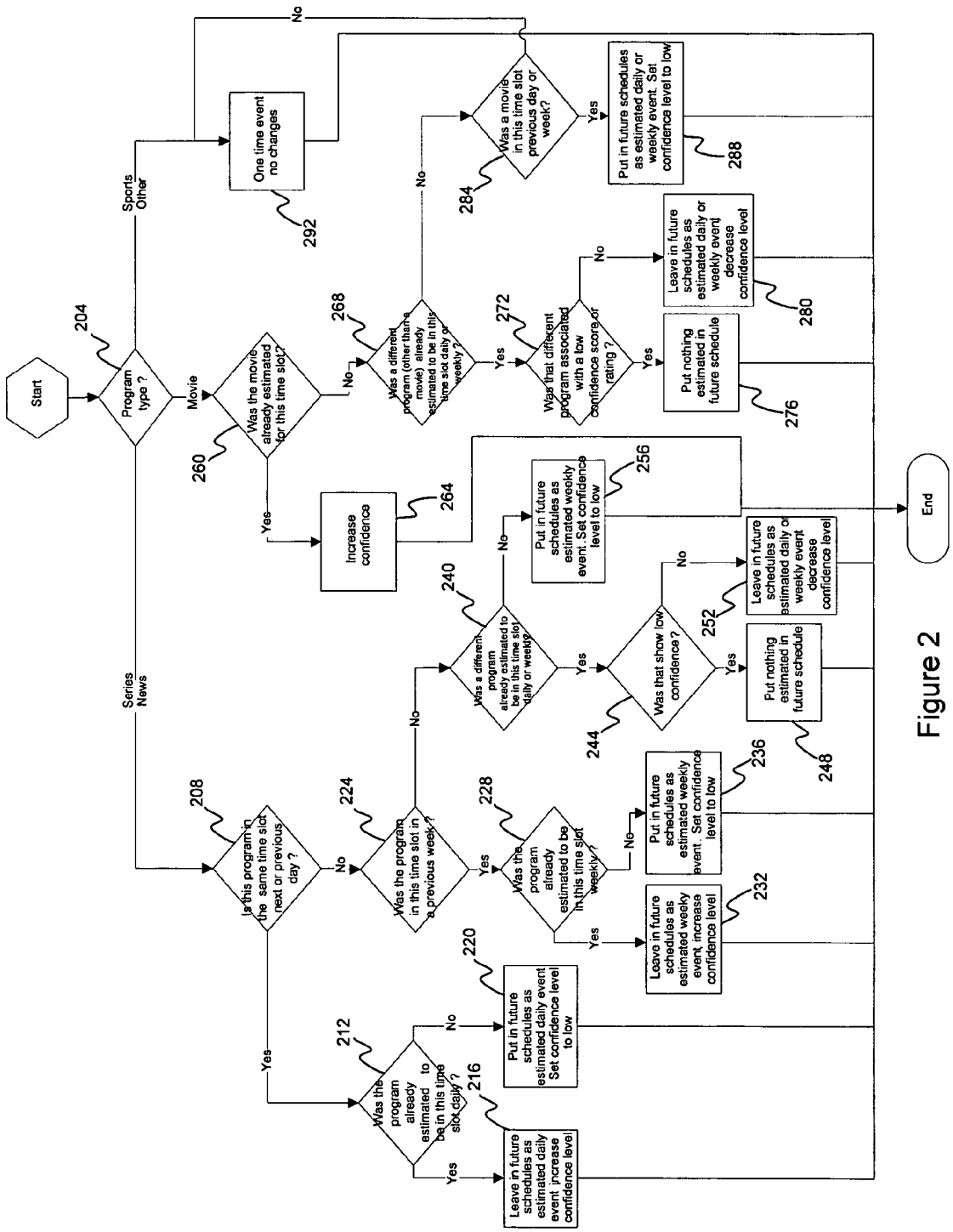
FIG. 2 is an operational flow diagram of a second algorithm used for modifying or refining the long term program guide (LTPG) created during the initialization period, in accordance with an embodiment of the invention.

FIG. 2 is an operational flow diagram of a second algorithm used for modifying or refining the long term program guide (LTPG) created during the initialization period, in accordance with an embodiment of the invention. The LTPG may be used by a user when the second algorithm has been employed. The initialization period, as previously described, utilizes the first algorithm shown in FIG. 1. At step 204, each scheduled program or event provided by a newly downloaded EPG data is analyzed for its program type. If a program comprises a series or news program, the process continues at step 208. At step 208, the second algorithm determines if the program is a daily event. The second algorithm determines if the program is broadcast at the same time slot on the next or previous day. If the program is scheduled to be broadcast the previous or the next day, the process proceeds with step 212. At step 212, the second algorithm determines whether the program was already estimated (by way of comparing the new EPG program data to the existing LTPG data) in the same date/time slot. If the newly received program data coincides with that of the estimated program data in the LTPG, then the process proceeds to step 216, at which the program data is left intact in future schedules of the LTPG. Additionally, the associated confidence rating or level is increased or set to a high level. If at step 212, the newly received program data does not coincide with that already stored in the LTPG, the process proceeds with step 220, at which the new program is stored in the LTPG as a daily event; however, the confidence level is set to a low level. If, at step 208, the second algorithm determines that the program is not broadcast at the same time slot on the next or previous day, the process proceeds to step 224. At step 224, the second algorithm determines if the program is a weekly event. The second algorithm determines if the program was broadcast at the same time slot in a previous week. If the program was broadcast at the same time slot in a previous week, the process proceeds to step 228, at which the second algorithm further determines if the program was already estimated by the LTPG to be in this time slot weekly. If the LTPG has already estimated this program to occur at this time slot as a weekly program, then the process proceeds to step 232. At step 232, the scheduled program data is left intact within the LTPG. Additionally, the associated confidence rating or level is increased or set to a high level. The high value may comprise any high value over any range of values. If at step 228, it is determined that the program was not already estimated by the LTPG to be in this time slot weekly, then the process proceeds to step 236. At step 236, the newly received program data is stored in the LTPG in its appropriate date/time slot as a weekly event. If at step 224, it is determined that the program was not scheduled in the same time slot in a previous week, the process continues at step 240. At step 240, it is determined if a different program was already estimated to appear in the same time slot either daily or weekly. If a different program was estimated to appear in this time slot either daily or weekly, then the process proceeds to step 244, at which an assessment is made concerning the different program's confidence level. The second algorithm, at this point, assesses whether the confidence level is low for this scheduled different program. If it is confidence level low, the process proceeds at step 248, at which nothing is stored for this date/time slot in the LTPG. Otherwise, the estimated program was rated at a high confidence level and the process proceeds at step 252, at which the estimated program is left intact within the LTPG and the confidence level is decreased. If at step 240, it is determined that a different program's time slot does not coincide with the time slot of the newly received program, either on a daily or weekly basis, then the process proceeds with step 256. At step 256, the newly received program data is stored in the LTPG as a scheduled event, and its associated confidence level is set to a low value. If at step 204, the second algorithm has determined that the program type coincides to that of a movie, then the process continues at step 260. At step 260, the second algorithm determines if the movie was already estimated by the LTPG in the received movie's time slot. If the movie was already estimated for the same time slot, the process continues at step 264, at which the confidence level or confidence rating is increased. Otherwise, at step 268, it is determined if there was a different program (i.e., other than a movie) already estimated to occur at the same time slot on a weekly or daily basis. If there was already a different program estimated by the LTPG at this time slot either on a daily or weekly basis, then the process proceeds at step 272, at which it is determined whether the different program has a low confidence rating. If the different program has a low confidence rating, the process proceeds at step 276, at which nothing is stored into the LTPG database for this time slot on a weekly or daily basis. Otherwise, if the different program had a high confidence rating, the process proceeds at step 280, at which the different program is stored in the LTPG database as an estimated daily or weekly event. However, the different program's confidence rating is lowered. If at step 268, it is determined that there was no other different program already estimated by the LTPG, then the process proceeds with step 284, at which it is determined if another movie was scheduled for the same time slot in a previous day or week. If a movie is scheduled for this time slot on a previous day or week, then the process continues with step 288, at which the movie is stored in the LTPG database as a daily or weekly event and the confidence level for this movie is set to a low level. If at step 284, there is no movie estimated for this time slot on a previous day or week, the process proceeds to step 292, at which the received movie is considered to be a one time event, and nothing is stored into the LTPG database. If at step 204, it is determined that the program type corresponds to a sports or special program, for example, then the process proceeds with step 292, at which the sports or special program is treated as a one time event. The sports or special is not stored into the LTPG database.

It is contemplated that the invention may utilize variations of the one or more steps described in the first and second algorithms referenced in FIGS. 1 and 2. As such, the invention may not be so limited and may be adapted to utilize variations and/or alternate algorithms without departing from the spirit and/or scope of the invention.

Figure 3:
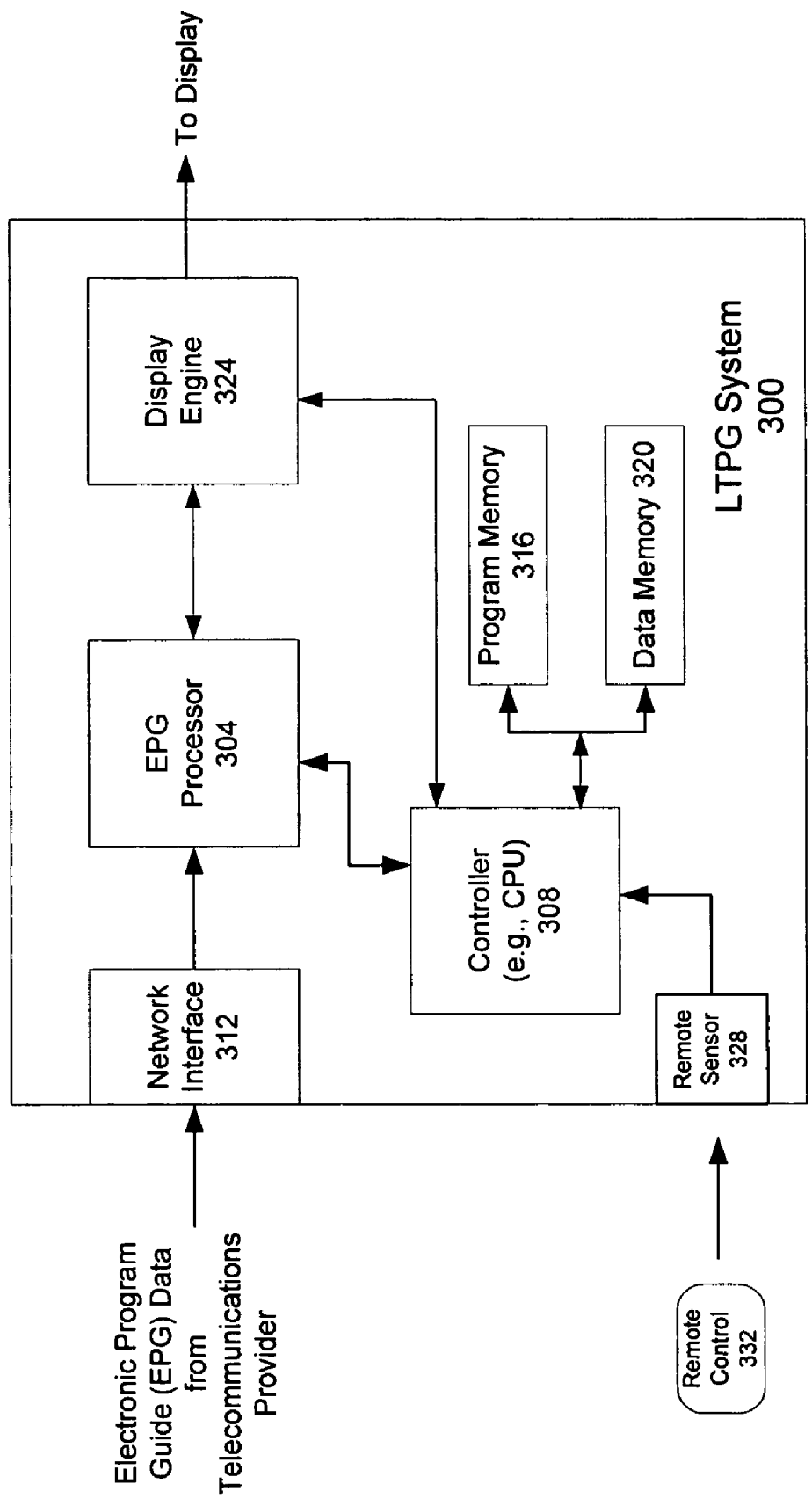
FIG. 3 is a block diagram of a LTPG system that implements long term program guide (LTPG) functionality, in accordance with an embodiment of the invention.

FIG. 3 is a block diagram of a LTPG system 300 that implements long term program guide (LTPG) functionality, in accordance with an embodiment of the invention. The LTPG system 300 may reside within a video recording device such as a personal video recorder (PVR) or DVD recorder. The LTPG system 300 forecasts or extrapolates long term program guide data using short term electronic program guide data provided by an electronic program guide (EPG). The LTPG system 300, as illustrated in FIG. 3, comprises an EPG processor 304, a controller 308, a network interface 312, a program memory 316, a data memory 320, a display engine 324, a remote sensor 328, and a remote control 332. The network interface 312 receives a transmission from a telecommunications carrier or provider capable of providing EPG data. The transmission may comprise a number of multiplexed signals such as video, audio, and the EPG data. The EPG processor 304 processes the downloaded EPG data by way of control provided by the controller 308. The EPG processor 304 may comprise a circuitry capable of filtering the received EPG data signal from the received video and/or audio signal. The controller 308 may comprise a processor such as a central processing unit (CPU). In a representative embodiment, the controller 308 may execute software resident in the program memory 316 to facilitate the implementation of one or more algorithms, such as the first and second algorithms described in relation to FIGS. 1 and 2. The data memory 320 may be used to store any EPG and LTPG data. The controller 308 may be used to facilitate storing the EPG and LTPG data into the data memory 320. In a representative embodiment, the EPG processor may employ circuitry that facilitates the implementation of one or more algorithms, such as the first and second algorithms described in relation to FIGS. 1 and 2. The display engine 324 processes LTPG data for presentation onto a suitable display. The controller 308 may provide control signals to the display engine 324 such that the display engine properly transmits LTPG data to a display. The remote sensor 328 receives signals from a remote control 332 as shown in FIG. 3. A user of the PVR or DVD recorder may make one or more program or event selections using the remote control 332. The remote sensor 328 communicates the one or more program or event selections to the controller 308 such that one or more program selections may be recorded by the video recording device in the future. The LTPG system 300 may communicate with a recording subsystem of the video recording device to facilitate recording of one or more programs selected by the user. For example, if the video recording device comprises a digital video recorder (DVR), the recording subsystem of the video recording device may comprise DVR processing electronics, a disk drive controller, read/write head, and disk drive media.

Figure 4:
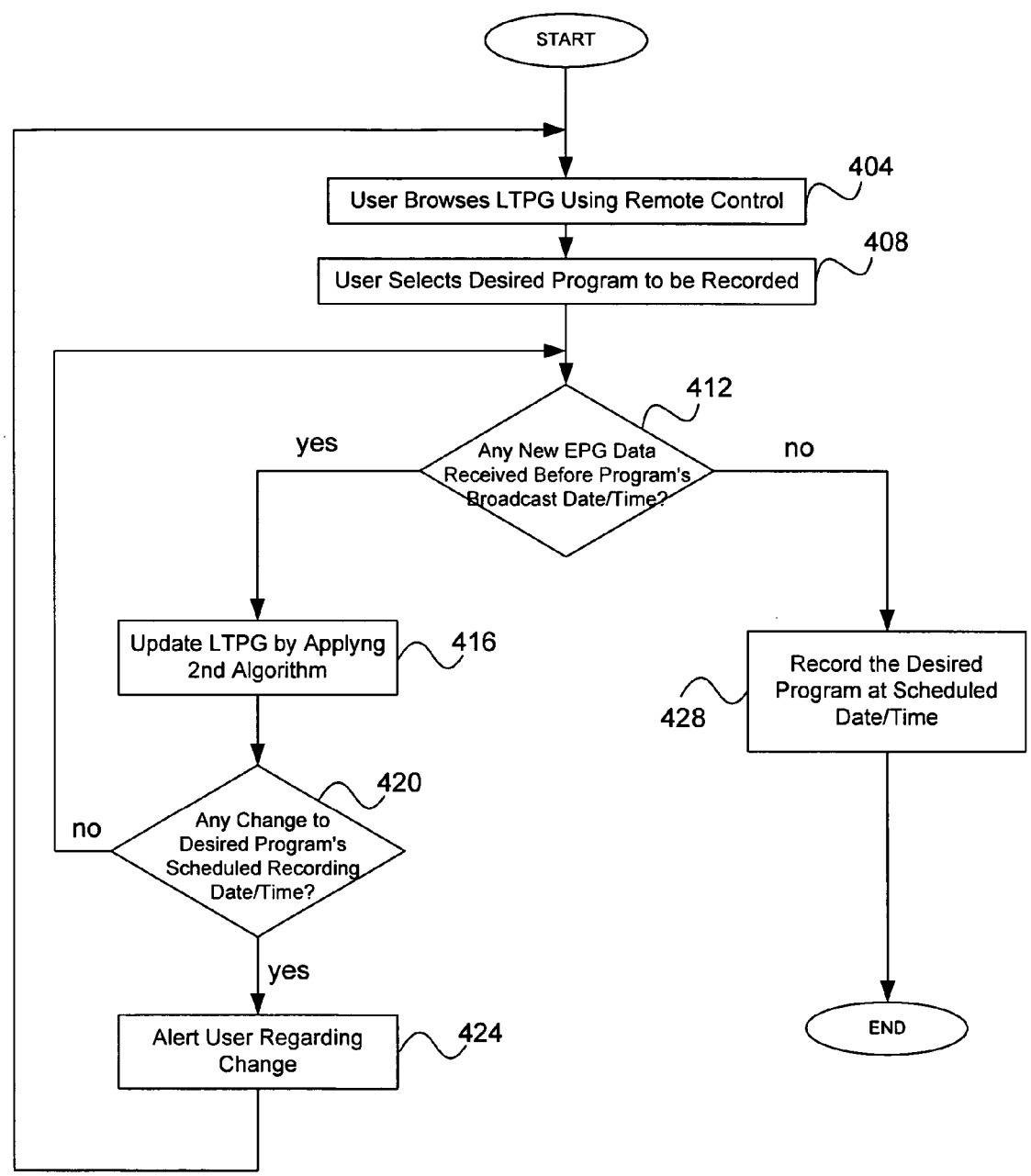
FIG. 4 is a flow diagram that describes the operation of the LTPG system within a video recording device, in accordance with an embodiment of the invention.

FIG. 4 is a flow diagram that describes the operation of the LTPG system within a video recording device, in accordance with an embodiment of the invention. As discussed previously, the video recording device may comprise a personal video recorder (PVR), a digital video recorder (DVR), or DVD recorder, for example. At step 404, a user browses the long term program guide (LTPG) by viewing a display and using his remote control. At step 408, the user selects a desired program to be recorded in the future by using his remote control. At step 412, periodic assessments are made concerning whether any new EPG data has been received before the program's scheduled broadcast (or scheduled recording) date and time (or time slot). If new EPG data is received, the process continues at step 416, at which the new EPG is processed and the LTPG is refined or updated by way of using the second algorithm. (In the representative embodiment of FIG. 4, it is assumed that the LTPG system has already been initialized using the first algorithm described in relation to FIG. 1.) Next at step 420, an assessment is made whether any change to the desired program's scheduled recording date/time has been made to the updated LTPG. If a change to the desired program's date/time has been made, the process continues at step 424. At step 424, an alert is issued to the user regarding the change in the broadcast date/time of the desired program. As a result of the alert, the user may now contemplate making alternate selections by browsing the LTPG. Thereafter, the process reverts back to step 412. If, at step 412, no additional EPG data is received before the program is broadcasted, the process proceeds to step 428. At step 428, the program is recorded by the video recording device at its scheduled date/time.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of providing long term forecasting of a broadcast date and time slot of a program, said method comprising:

developing a long term program guide over an initial period using a first electronic program guide (EPG) data, said first EPG data received during said initial period; and refining said long term program guide using a second electronic program guide (EPG) data, said second EPG data received after said initial period, wherein said developing comprises determining a first probability of occurrence of said program being broadcasted on said broadcast date and time slot and comparing newly received electronic program guide (EPG) data with historically processed EPG data.

2. The method of claim 1 wherein said first probability of occurrence is determined by considering program type or genre information of said program.

3. The method of claim 1 wherein said first probability of occurrence is determined by considering the temporal pattern of previous broadcasts of said program.

4. The method of claim 1 wherein said refining comprises utilizing said first probability of occurrence to generate a second probability of occurrence of said program being broadcasted on said broadcast date and time slot.

5. The method of claim 4 comprising comparing newly received electronic program guide (EPG) data with said historically processed EPG data.

6. The method of claim 5 wherein said first probability of occurrence and said second probability of occurrence is determined by comparing said broadcast date and time slot of said program using said newly received EPG data against said broadcast data and time slot of said program using said historically processed EPG data.

7. The method of claim 5 comprising utilizing program type or program genre as a criterion.

8. The method of claim 5 comprising utilizing historical time pattern information as a criterion.

9. The method of claim 1 wherein said first electronic program guide (EPG) data is received on a daily basis.

10. The method of claim 1 wherein said initial period comprises no more than two weeks of time.

11. The method of claim 1 wherein said initial period comprises no more than one month of time.

12. The method of claim 1 wherein said initial period comprises one week of time.

13. A system for forecasting the broadcast date and time slot of a program comprising:

a controller;

a memory for storing electronic program guide (EPG) data received from an EPG provider; and said controller operable for developing a long term program guide (LTPG) over an initialization period using a first portion of said EPG data using a first algorithm, said first portion of EPG data received during said initialization period, and for refining said long term program guide using a second portion of said EPG data using a second algorithm, said second portion of EPG data received after said initialization period;

wherein said first and said second algorithms utilize program type or program genre.

14. The system of claim 13 wherein said controller determines a first probability of occurrence of said program being broadcasted on said broadcast date and time slot, said first probability of occurrence based on said first algorithm comparing a newly received first portion of EPG program data with an historically processed first portion of EPG data.

15. The system of claim 14 wherein said historically processed first portion of EPG program data comprises a first download of said first portion of EPG data.

16. The system of claim 14 wherein said controller utilizes said first probability of occurrence to generate a second probability of occurrence of said program being broadcasted at said broadcast date and time slot, said second probability of occurrence based on comparing a newly received second portion of EPG data with an historically processed second portion of EPG data of said LTPG.

17. The system of claim 13 wherein said controller utilizes historical time pattern information.

18. The system of claim 13 further comprising:

a processor used to filter said EPG data such that said EPG data may be stored in said memory;

a remote control used for inputting one or more desired program selections from a user, such that said one or more desired program selections may be recorded in the future; and a remote sensor used to receive said program selections transmitted by said remote control, said remote sensor transmitting said program selections to said controller.

19. A method of recording a program or event using a video recording device comprising:

providing a long term forecast using a long term program guide (LTPG), said LTPG providing a schedule of programs to be broadcast in the future to a user, said LTPG extending beyond a short term forecast provided by an electronic program guide (EPG), said short term forecast generating a first set of confidence levels associated with said schedule of programs, said long term forecast generating a second set of confidence levels based on said first set of confidence levels;

displaying said long term forecast to said user;

receiving an input from said user by way of a remote control, said input providing a desired program selection, said desired program selection associated with a program name, date, and time slot;

updating said long term forecast using newly received electronic program guide (EPG) data, said updating performed if said newly received EPG data is received prior to said date and time slot indicated by said LTPG; and alerting said user if a change has occurred regarding said program name and said date and time slot such that said user may make an alternate program selection.

20. The method of claim 19 wherein said video recording device comprises a personal video recorder (PVR).

21. The method of claim 19 wherein said video recording device comprises a digital video recorder (DVR).

22. The method of claim 19 wherein said video recording device comprises a DVD recorder.

23. The method of claim 19 wherein said long term program guide (LTPG) is implemented within said video recording device.

* * * * *